P. NOACK.
APPARATUS FOR EXTINGUISHING SPARKS FROM SHODDY AND THE LIKE.
APPLICATION FILED MAY 6, 1910.
1,050,990. Patented Jan. 21, 1913.
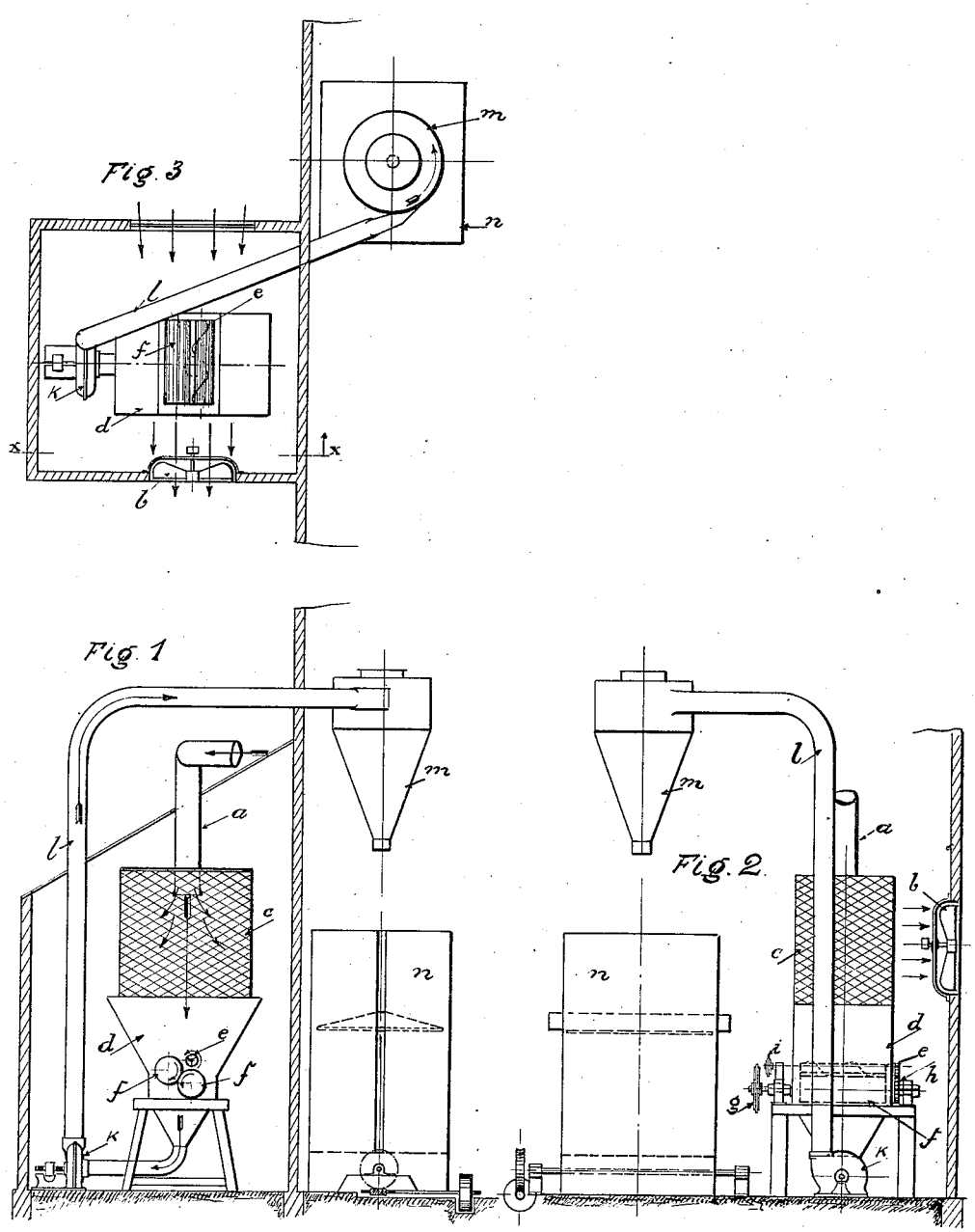
Witnesses
Inventor
Paul Noack

UNITED STATES PATENT OFFICE.

PAUL NOACK, OF HOLDEN, MASSACHUSETTS.

APPARATUS FOR EXTINGUISHING SPARKS FROM SHODDY AND THE LIKE.

1,050,990.  Specification of Letters Patent.  Patented Jan. 21, 1913.

Application filed May 6, 1910.  Serial No. 559,861.

*To all whom it may concern:*

Be it known that I, PAUL NOACK, a citizen of the United States, residing at Holden, in the county of Worcester and Commonwealth of Massachusetts, have invented a new and useful Improvement in Apparatus for Extinguishing Sparks from Shoddy and the Like, of which the following is a specification, accompanied by drawings forming a part of the same.

My invention relates to an apparatus for extinguishing sparks from shoddy and like materials and consists in compressing the same by causing it to pass between rotating rollers, and has for its object to smother any sparks which may be present in said material.

Referring to the drawings, Figure 1 is a front vertical sectional view on the broken line $x$—$x$, Fig. 3. Fig. 2 is a side view of the apparatus. Fig. 3 is a top view of Fig. 2.

Similar reference characters refer to similar parts in the different figures.

In the drawings the material is introduced into my apparatus through a pipe $a$, and falls into a chamber $c$ open at the bottom and with its sides composed of screening material. While passing through the chamber $c$ the dust is removed by means of the exhaust fan $b$ and the material then falls into the hopper $d$. Near the bottom of the hopper $d$ and in adjustable proximity to each other are a pair of rollers $f$ journaled in the frame of the apparatus and rotated in opposite directions, as indicated by the arrows, by means of the chain wheel $g$ and the gears $h$. In order to separate and disintegrate the material so that it will pass readily between the rollers $f$, and will not collect thereon, I place a winged roller $e$ journaled in the frame of the apparatus and rotated in the direction of the arrow by the chain wheel $i$. The wing on this roller $e$, as clearly indicated in Figs. 2 and 3, extends in the form of a spiral along the surface of the roller. This peculiar shape of the wing causes the material which it acts upon not only to be properly disintegrated, but also to be spread evenly along the length of the rolls so that it will not pass between the spark extinguishing rolls $f$ in bunches. A bunch of material passing between the rolls $f$ would tend to spread them so as to leave a space at some other point through which smaller quantities of material might pass without being sufficiently compressed to smother any sparks present therein. The material then passes between the rollers $f$ and is sufficiently compressed to extinguish all sparks which it contains and, by means of a blower $k$, is discharged through the pipe $l$ into a hopper $m$ from which it falls into the press $n$.

Variable space between the rollers adaptable to various materials may be obtained by the usual screw adjustment.

I do not confine my invention to a single pair of rollers, but, if desired, a series or train of rollers may be employed.

I claim:

1. An apparatus for extinguishing sparks in shoddy or similar material, including a pair of parallel spark extinguishing rollers with their peripheries in proximity, means for rotating these rollers in opposite directions, a rotatable winged roller above said spark extinguishing rollers for disintegrating the material, and a hopper for conducting the material to said rollers.

2. An apparatus for extinguishing sparks in shoddy or similar material, including a pair of parallel spark extinguishing rollers with their peripheries in proximity, means for rotating these rollers in opposite directions, a rotatable roller above said spark extinguishing rollers, said last named roller carrying a spiral wing for disintegrating the material, and a hopper for conducting the material to said rollers.

3. An apparatus for extinguishing sparks in shoddy or similar material, including a pair of parallel spark extinguishing rollers with their peripheries in proximity, means for rotating the rollers in opposite directions, means above said spark extinguishing rollers for disintegrating the material, and a hopper for conducting the material to the rollers and disintegrating means.

In testimony whereof I have signed my name to this specification in the presence of two subscribing witnesses.

PAUL NOACK.

Witnesses:
M. FITZSIMMONS,
CHARLES S. WEBSTER.

Copies of this patent may be obtained for five cents each, by addressing the "Commissioner of Patents, Washington, D. C."